(12) United States Patent
Hirooka et al.

(10) Patent No.: US 7,444,918 B2
(45) Date of Patent: Nov. 4, 2008

(54) PYROTECHNIC ACTUATOR

(75) Inventors: Masato Hirooka, Tatsuno (JP); Mikio Yabuta, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 11/761,160

(22) Filed: Jun. 11, 2007

(65) Prior Publication Data
US 2007/0295232 A1    Dec. 27, 2007

Related U.S. Application Data

(60) Provisional application No. 60/813,708, filed on Jun. 15, 2006.

(30) Foreign Application Priority Data

Jun. 14, 2006    (JP)    .............................. 2006-164180

(51) Int. Cl.
B64D 1/04    (2006.01)
(52) U.S. Cl. ..................... 89/1.14; 137/68.13
(58) Field of Classification Search .................. 89/1.14; 137/68.13
See application file for complete search history.

(56) References Cited

U.S. PATENT DOCUMENTS

| | | | |
|---|---|---|---|
| 3,261,261 A | 7/1966 | Brown | |
| 6,568,184 B2 * | 5/2003 | Blackburn et al. | ............ 60/636 |
| 6,631,924 B2 * | 10/2003 | Nomura et al. | ............. 280/777 |
| 6,851,372 B2 * | 2/2005 | Bender et al. | ................ 102/530 |
| 2002/0014076 A1 | 2/2002 | Blackburn et al. | |
| 2003/0029307 A1 * | 2/2003 | Daoud | ........................ 89/1.14 |
| 2007/0187993 A1 | 8/2007 | Kalargeros | |
| 2008/0060512 A1 * | 3/2008 | Katsuda et al. | ................. 92/63 |

FOREIGN PATENT DOCUMENTS

| | | |
|---|---|---|
| DE | 100 16 391 A1 | 10/2001 |
| DE | 202 14 904 U1 | 9/2002 |
| EP | 0 657 326 A1 | 6/1995 |
| WO | WO-2004/071821 A1 | 8/2004 |

* cited by examiner

*Primary Examiner*—J. Woodrow Eldred
*Assistant Examiner*—Gabriel J Klein
(74) *Attorney, Agent, or Firm*—Birch, Stewart, Kolasch & Birch, LLP

(57) ABSTRACT

The present invention relates to a pyrotechnic actuator, containing:
  a housing,
  a piston slidable inside the housing,
  an igniter disposed within the housing and causing the piston to slide,
  the piston including a piston head having a pressure-receiving surface with which a combustion product, produced by actuation of the igniter, collides,
  a piston rod extending from the piston head and further,
  a resin portion provided at least in a part of the piston,
  the resin portion being disposed in contact with a member including the housing,
  the piston being fixed by contacting the resin portion to the member including the housing, and
  the piston being prevented from moving before activation of the igniter.

7 Claims, 5 Drawing Sheets

PYROTECHNIC ACTUATOR

This nonprovisional application claims priority under 35 U.S.C. § 119(a) on Patent Application No. 2006-164180 filed in Japan on 14 Jun. 2006 and 35 U.S.C. § 119(e) on U.S. Provisional Application No. 60/813,708 filed on 15 Jun. 2006, which are incorporated by reference.

BACKGROUND OF INVENTION

Field of Invention

The present invention relates to a pyrotechnic actuator that can be used in a restraining device of a vehicle, for example for a human body.

In addition to airbag-type restraining devices that are used in passenger-restraining devices of automobiles or pedestrian protection devices, there are, for example, devices in which an automobile hood is raised to protect a pedestrian during collision and devices in which a steering wheel is pulled in (pulled forward in the vehicle).

These devices use pyrotechnic actuators. Actuators of a type in which a pin is pushed out on actuation and actuators in which a protruding pin is pulled in on actuation are known.

In pyrotechnic actuators that operate a piston by actuation of an igniter, the piston has to be fixed to prevent it from moving before the actuation, and a shear pin has been most often used to fix the piston.

U.S. Pat. No. 3,261,261 discloses an actuator in which a piston is pulled in. Before the actuation, an insert 14 shown in FIG. 1 is fitted in a body 13, and the insert 14 and a main body are connected by introducing a rod 25 into a port 15 formed in the insert 14. On actuation, the rod moves to the right side in FIG. 1, the connection with the insert 14 is cancelled, and the insert 14 falls down as shown in FIG. 3.

By fixing the rod 25 with a shear pin 27 before the actuation, the piston is prevented from moving even when a force below a predetermined value is applied to the piston before the actuation, and if the larger force is applied, the shear pin 27 is fractured by a shear force and the piston moves.

SUMMARY OF INVENTION

The present invention relates to a pyrotechnic actuator containing:
  a housing,
  a piston slidable inside the housing
  an igniter disposed within the housing for causing the piston to slide,
  the piston including a head having a pressure-receiving surface with which a combustion product, produced by actuation of the igniter, collides,
  a rod extending from the head and further,
  a resin portion provided at least in a part of the piston,
  the resin portion being disposed in contact with a member including the housing,
  the piston being fixed by contacting the resin portion to the member including the housing,
  the piston being prevented from moving before activation of the igniter.

The present invention may be used as a restraining device of a vehicle, for example for a human body.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
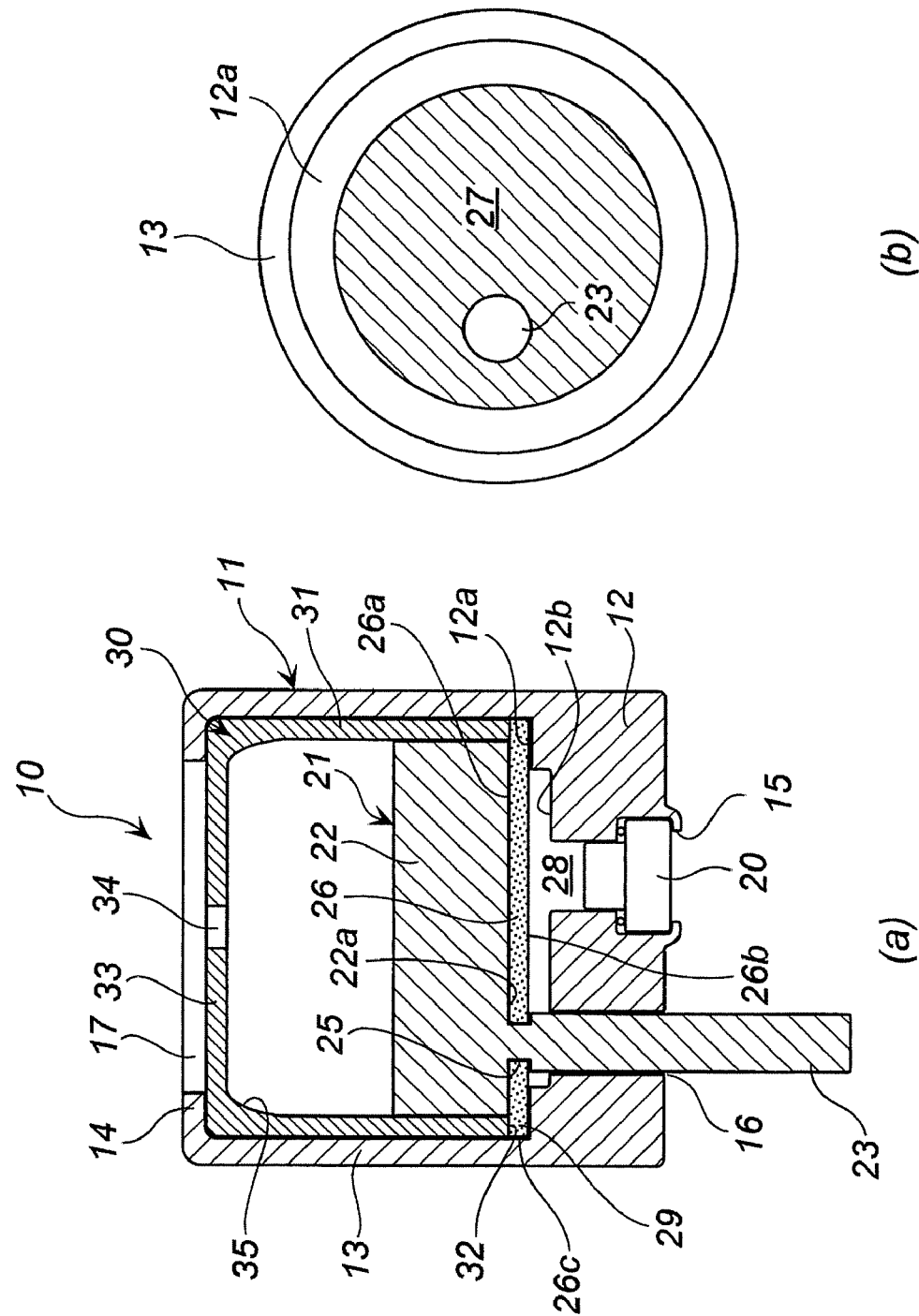
In FIG. 1, (a) shows a longitudinal sectional view of an actuator, and (b) illustrates the range of a pressure-receiving surface.

In U.S. Pat. No. 3,261,261, however, when a shear pin 27 is inserted, because the shear pin has to be inserted after the hole in the body and the hole in the rod are aligned, the insertion operation is difficult.

The present invention provides a pyrotechnic actuator in which a piston can be fixed without using the conventional shear pin and, therefore, the piston can be fixed in a simple manner and the assembly is easy.

"Piston head" will be abbreviated hereinbelow to "head", and "piston rod" will be abbreviated to "rod".

In the pyrotechnic actuator in accordance with the present invention, the head moves inside the housing by actuation of the igniter, whereby the rod that is integrated with the head is pulled into the housing or pushed out of the housing.

In the piston, the rod extends from the end surface of the head. The head and the rod may be formed integrally, or separate members may be connected.

The pressure-receiving surface is a surface to be pushed with the pressure due to collision of a combustion product (shock wave, flame, high-temperature gas, etc.) generated by the actuation of the igniter, and the piston moves when the pressure-receiving surface is pushed with pressure. Such a pressure-receiving surface may be the end surface of the head covered with another member, to receive pressure of the combustion product via said another member. When the end surface of the head is thus covered with said another member, the surface of said another member essentially becomes the pressure-receiving surface.

It is necessary that the piston does not move before the actuation of the igniter but moves instantaneously when the igniter is actuated. In accordance with the present invention, a resin portion that is integrated with the piston is used, rather than a shear pin that is a separate member disclosed in U.S. Pat. No. 3,261,261, as means for preventing the piston from moving.

The resin portion demonstrates a function of preventing the above-described piston from moving, and this resin portion may be obtained by integrating the piston with a separate resin member, or at least one of the head and the rod may be formed from a resin and part thereof may be used as the resin portion. For example, in the case where the head itself is formed from a resin and part thereof serves as a resin portion, molding is facilitated and weight can be reduced. Furthermore, it is preferred that a resin with good heat resistance (polyamides such as Nylon 6, Nylon 66, and various aromatic polyamides) be used as the resin portion, but even when the resin portion comes into contact with the combustion product generated by the actuation of the igniter, because period of time during the igniter is operated is instantaneous and an extremely small amount of air is present inside the actuator, no inconvenience such as combustion of the resin portion can be occur.

The resin portion is disposed in contact with a member including the housing, and the piston is fixed by contacting the resin portion to the member including the housing. The member including the housing may be the housing itself or a combination of the housing and another member of a desirable shape such as a cup member, a tubular member, a disk-shaped member, or an annular member that can be disposed inside the housing (for example, retainers of various shapes that are generally employed in gas generators for airbags can be also used).

A method of fixing a piston by a resin portion is as follows:

providing a groove or a recess in a metal member including a housing, providing a resin portion as a resin protrusion, and fitting the resin protrusion into the groove or recess, maintaining the resin portion and the metal member including the housing in a state of press-contact and using a friction force, or combining the above-described two.

In the pyrotechnic actuator in accordance with the present invention, the movement of the piston is prevented by contacting the resin portion to the member including the housing before the actuation of the igniter, and during the actuation of the igniter, combustion product generated by the actuation of the igniter collides with the pressure-receiving surface of the head, the pressure-receiving surface is pushed with pressure to release the contact state of the resin portion and member including the housing, (for example, when a resin protrusion is fitted into a recess in a metal member, the protrusion is broken and the contact state is released) and then, the piston moves instantaneously.

In the pyrotechnic actuator in accordance with the present invention, the piston is fixed easier than in the case where a shear pin is used, as described in U.S. Pat. No. 3,261,261, thereby the whole assembling process is simplified.

The present invention further relates to the pyrotechnic actuator, wherein the resin portion is a resin protrusion formed radially on the outer side of the piston, and the resin protrusion is fixed by a combination of an inner wall surface of the housing and at least one of a cup member and a tubular member disposed inside the housing to fix the piston, whereby the piston is prevented from moving before the igniter is actuated.

In the pyrotechnic actuator in accordance with the present invention, before the igniter is actuated, the piston is fixed and prevented from moving by the inner wall surface of the housing and a cup member, a tubular member or a combination thereof (for example, the movement is prevented by sandwiching and fixing the resin protrusion by the aforementioned members or a combination thereof), and when the igniter is actuated, the fixing portion of the resin protrusion is broken and the piston moves instantaneously.

The resin protrusion may be formed in at least a portion of the metal piston, the entire head may be formed from a resin, and a resin protrusion may be provided in a portion thereof.

Provided that the resin protrusion can be fixed by the inner wall surface of the housing, a cup member, a tubular member, or a combination thereof, the resin protrusion may be formed at the head or the rod, or formed to extend to both the head and the rod. The resin protrusion may be a continuous resin annular protrusion, a protrusion in the form of a ring as a whole, but having locally cut-out portions, or a plurality of independent protrusions.

(I) A case in which only a cup member is used as means for fixing the resin protrusion A piston is disposed so that the resin protrusion is disposed on the inner wall surface on one end side of the housing (the inner wall surface on the side where the igniter is disposed). Further, a cup member is disposed and fixed to cover the resin protrusion. With such an arrangement, the resin protrusion is sandwiched and fixed by the inner wall surface on one end side of the housing and the circumferential edge of the open portion of the cup member.

When only the cup member is used as the fixing means, in order to insert the cup member into the housing at the time of assembling the actuator, the other end portion of the housing (end portion on the side opposite that where the igniter is disposed) has to be open to a degree large enough to insert the cup member. Further, after the cup member has been inserted from the open portion of the housing, the circumferential edge of the open portion of the housing is crimped and the circumferential edge portion of the bottom surface of the cup member is fixed. Further, because the head moves towards the bottom surface of the cup member during actuation, an air drain hole is provided in the bottom surface to ensure the smooth movement of the head.

(II) A case in which only a tubular member is used as means for fixing the resin protrusion A piston is disposed so that the resin protrusion is disposed on the inner wall surface on one end side of the housing (the inner wall surface on the side where the igniter is disposed). Further, a tubular member is disposed and fixed to cover the resin protrusion. With such an arrangement, the resin protrusion is sandwiched and fixed by the inner wall surface on one end side of the housing and the circumferential edge of the open portion of the tubular member.

When only the tubular member is used as the fixing means, it is assembled by a method similar to the case (I) by which after the tubular member has been inserted from the open portion of the housing, the circumferential edge of the open portion on the other end side of the tubular member is crimped (bent to form a flange on the inner side) and then the circumferential edge of the open portion of the housing is crimped to fix the tubular member, or by a method by which only the circumferential edge of the open portion of the housing is crimped to fix the tubular member. In this case, similarly to case (I), an air drain hole is also provided.

(III) A case in which a combination of a cup member and a tubular member is used as means for fixing the resin protrusion A tubular member is disposed close to the igniter, then a resin protrusion is disposed, and a cup member is disposed to cover the resin protrusion. With such an arrangement, the resin protrusion is sandwiched and fixed by the tubular member and the cup member. A combination of two tubular members may be used, without using the cup member, provided that the resin protrusion can be similarly fixed.

When a combination of the tubular member and the cup member is used (or when a combination of two tubular members is used), the actuator is assembled in the same manner as in the above-described case (I) (or (II)).

The present invention further relates to the pyrotechnic actuator, wherein the resin portion is a resin protrusion formed radially on the outer side of the piston, a step portion is provided in an inner wall surface of the housing, the piston is fixed in a state where the resin protrusion abuts against the step portion, and the piston is prevented from moving before the igniter is actuated.

In the pyrotechnic actuator in accordance with the present invention, before the igniter is actuated, the piston is prevented from moving by the resin protrusion abutting against the step portion, and when the igniter is actuated, the part of the resin protrusion which abuts against the step portion is broken so that the piston moves instantaneously.

The resin protrusion may be formed in at least a portion of the metal piston. The entire head may be formed from a resin, and a resin protrusion may be provided in a portion thereof.

The step portion is a portion in which a step is formed by cutting the inner wall surface of the housing in the circumferential direction in the desired location in the longitudinal direction of the housing. Provided that the resin protrusion and the step portion can abut against each other, they may be in the form of an annular protrusion or annular step, or an annular protrusion or annular step in the form of a ring as a whole, but having locally cut-out portions, or a plurality of independent protrusions or steps.

The present invention further relates to the pyrotechnic actuator, wherein the resin portion is a tubular member having an annular protrusion projecting from the inner circumferential surface of the resin member, the head has an annular groove formed on the outer circumferential surface thereof, an inner circumferential surface of the tubular member abuts against the outer circumferential surface of the head, and the annular protrusion of the tubular member is fitted into the annular groove of the head, whereby the piston and the tubular member are integrated, and a circumferential edge of an open portion at one end side of the tubular member abuts against an annular step portion formed at the inner wall surface of the housing, whereby the piston is fixed and the piston is prevented from moving before the igniter is actuated.

In the pyrotechnic actuator in accordance with the present invention, before the igniter is actuated, the circumferential edge of the open portion on one end side of the tubular member that is a resin portion abuts against the annular step portion formed at the inner wall surface of the housing, thereby preventing the piston from moving, and when the igniter is actuated, the portion of the annular protrusion that is fitted into the annular groove is broken and torn away, thereby causing the instantaneous movement of the piston.

No specific limitation is placed on the positions, in the lengthwise direction, of the annular protrusion formed at the inner circumferential surface of the tubular member and of the annular groove formed in the outer peripheral surface of the head. From the standpoint of preventing the movement of the piston before the igniter is actuated, it is preferred that the positions be in the central section in the lengthwise direction of the head.

The width of the step surface (surface perpendicular to the lengthwise direction) of the annular step portion formed on the inner wall surface of the housing is about the same as the width of the circumferential edge of the open portion at one end side of the tubular member. No specific limitation is placed on the formation position of the annular step portion, and this position is adjusted in relation to the length of the housing and the length of the piston accommodated inside the housing. For example, when the end surface of the rod is made not to protrude from the housing before the igniter is actuated or, conversely, when it is made to protrude, the formation position of the annular step portion is adjusted accordingly.

The present invention further relates to the pyrotechnic actuator, wherein the head has a non-through hole which is formed in a thickness direction in an apex surface of the head and which has at least the bottom portion thereof formed from a resin, a cup member having a rod member provided to protrude from a bottom surface thereof is fixed on the circumference thereof by the inner wall surface of the housing and accommodated in combination with the head inside the housing, and the rod member of the cup member is inserted into the non-through hole of the head, and a distal end portion of the rod member abuts against the bottom portion of the non-through hole, whereby the piston is fixed and the piston is prevented from moving before the igniter is actuated.

In the pyrotechnic actuator in accordance with the present invention, before the igniter is actuated, the rod member of the cup member is inserted into the non-through hole of the head and a distal end portion of the rod member abuts against the bottom portion of the non-through hole, whereby the piston is prevented from moving, and when the igniter is actuated, the rod member breaks through the bottom portion of the non-through hole, thereby causing the instantaneous movement of the piston.

The head preferably has a non-through hole in the vicinity of the central portion of the apex surface. The entire head may be formed from a resin, or only the bottom portion of the non through hole may be formed from a resin. In the case where only the bottom portion of the non-through hole is made from a resin, for example, a through hole is formed in the metal head and one opening of the through hole is closed with a resin.

The cup member is fixed by abutting the entire circumferential surface and the circumferential edge of the open portion or part thereof against the inner wall surface of the housing. The cup member has a rod member provided to protrude form the bottom surface, and the position of the rod member is so adjusted that the rod member can be inserted into the non-through hole. The cup member is preferably made from a metal.

A combination of the non-through hole and the rod member serves as means for preventing the movement of the piston. Therefore, the thickness (strength) of the bottom portion of the non-through hole is such that the bottom portion is not fractured by the distal end portion of the rod member before the igniter is actuated and can be instantaneously fractured by the distal end portion when the igniter is actuated.

The present invention further relates to the pyrotechnic actuator, wherein a space formed inside the housing where the piston slides is set such that an inner diameter of one end portion where the head is located before actuating the igniter is smaller than an inner diameter of the opposite end portion, so that the head can be fitted into the smaller-diameter end portion.

The space formed inside the housing where the piston slides is a space formed by the housing, a space formed by the cup member or the tubular member disposed inside the housing.

When the igniter is actuated, the head moves from one end to the opposite end inside the housing (or inside the cup member or the tubular member), but the inner diameter of the opposite end portion is reduced (the end portion is tapered), so that the moving head fits therein. As a result, after the actuation, the head is prevented from moving backward caused by colliding with the inner wall surface of the housing (or the inner wall surface of the cup member of the inner wall surface of the tubular member.

The inner diameter of the opposite end portion of the housing (or the cup member or the tubular member) is set to be slightly less than the outer diameter of the head. It is further preferred that the inner diameter is set to be reduced gradually, thereby ensuring the above-described action.

The present invention further relates to the pyrotechnic actuator, wherein a pressure-receiving surface of the head has an area of 50% or more the area of the end surface including a central portion of an end surface of the head that faces the igniter.

The end surface of the head that faces the igniter is connected to a rod and has a pressure-receiving surface. Therefore, in order to ensure a smoother movement of the piston, the pressure-receiving surface preferably includes the central portion of the end surface of the head that faces the igniter and even more preferably has an area of 50% or more (even more preferably 60% or more) the area of this end surface.

The pyrotechnic actuator in accordance with the present invention does not use a shear pin as means for preventing the piston from moving unlike the conventional actuators, and the assembling is, therefore, facilitated.

EMBODIMENTS OF INVENTION

Embodiments of the present invention will be explained below. The terms "pyrotechnic actuator", "piston head", "piston rod", and "igniter collar" will be abbreviated hereinbelow as "actuator", "head", "rod", and "collar", respectively.

(1) Actuator Shown in FIG. 1

FIG. 1(a) is a longitudinal sectional view of an actuator 10. FIG. 1(b) is employed to explain the range and positional arrangement of a pressure-receiving surface (in the case of viewing from the igniter) in FIG. 1(a); this view does not show the cross-sectional structure.

A housing 11 is made from a metal such as stainless steel, aluminum, zinc, or the like. The section of the housing 11 in the longitudinal direction has a substantially square shape and the cross section in the lateral direction has a round shape. These shapes can be changed appropriately according to the installation object of the actuator 10 or the required performance.

Two through holes 15, 16 are provided in a housing wall 12 on one end side of the housing 11, and the other end side is widely opened (open portion 17). The housing wall 12 essentially serves as a collar, and an electric igniter 20 is attached in a through hole 15.

A metal (stainless steel, aluminum, zinc, or the like) piston 21 is disposed inside the housing 11. The piston 21 is an assembly of a head 22 and a rod 23. The rod 23 extends perpendicularly from a position offset from the central section of one end surface 22a of the head 22.

The head 22 is positioned inside the housing 11, and the rod 23 extends from and to the outside of the housing 11 via the through hole 16. An annular groove 25 is formed in the boundary portion of the head 22 and the rod 23.

A resin disk 26 is molded integrally with the head 22 and the rod 23. The entire surface of a surface 26a, with the exception of a circumferential edge section, is in contact with an end surface 22a of the piston head, and the disk 26 is integrated in a state of holding the circumference of the annular groove 25.

A circumferential edge section of a surface 26b in the resin disk (except for the central section) is in contact with an inner surface 12a of the housing wall 12, but a gap is present between the inner surface 12a and an inner surface 12b having a step. As a result, a space 28 is formed by the resin disk 26 (surface 26b), rod 23, inner surface 12b, and through hole 15 (section where the igniter 20 is not attached) between the igniter 20 and the resin disk 26.

A portion of the head end surface 22a that faces the space 28 serves as a pressure-receiving surface, but in the present embodiment, a portion of the resin disk 26 (surface 26b) that faces the space 28 (and the igniter 20) becomes an essential pressure-receiving surface 27 (a hatched region in FIG. 1(b)). Thus, the pressure-receiving surface 27 is a surface 26b excluding the surface that is in contact with the inner surface 12a and a portion of the surface 26b where the rod 23 is formed.

The pressure-receiving surface 27 (surface including the central portion of the surface 26b) of the head 22 (resin disk 26) has an area of about 50% the area of the head end surface 22a. Because the pressure-receiving surface 27 can be further increased by the presence of the space 28, the transmission of pressure produced by combustion product generated from the igniter 20 is improved and the piston 21 moves more smoothly.

The diameter of the resin disk 26 is larger than the diameter of the head 22, and a circumferential surface 26c of the resin disk 26 abuts against the inner surface of the housing circumferential wall 13. As a result, a resin annular protrusion 29 is formed according to the difference between the diameter of the resin disk 26 and the diameter of the head 22.

A cup member 30 is inserted from the open portion 17 of the housing 11. A distal end portion of the circumferential wall 31 is inserted into a cylindrical gap between the housing circumferential wall 13 and the head 22, and a circumferential edge 32 of the open portion abuts against the resin annular protrusion 29.

The inner diameter of the cup member 30, except the vicinity of a bottom surface 33, is so adjusted as to enable the sliding of the head 22, and the inner diameter from a portion close to the bottom surface 33 to the bottom surface 33 is set to decrease gradually, to be smaller than the diameter of the head 22 (a reduced-diameter portion 35 is formed). An air drain port 34 is provided in the central portion of the bottom surface 33 of the cup member 30.

Because the upper end portion of the circumferential wall 13 of the housing is crimped and pressed with pressure (crimped portion 14), the bottom surface 33 of the cup member 30 receives this pressure, and the circumferential edge 32 of the open portion presses with pressure the resin annular protrusion 29. As a result, the resin annular protrusion 29 is squeezed from both sides and fixed by the circumferential edge 32 of the open portion of the cup member 30 and the inner surface 12a of the housing wall 12.

The actuator 10 in accordance with the present invention may also have a configuration in which a similar operation is enabled by forming a component similar to the resin annular protrusion 29 integrally with the housing 11.

The operation of the actuator 10 will be described below. Before the igniter 20 is actuated, the resin annular protrusion 29 is fixed by the cup member 30 and the inner surface 12a of the housing wall 12. Therefore, the piston 21 cannot move even when vibrations are applied from the outside. When the igniter 20 is actuated, the combustion product is generated and collide with the pressure-receiving surface 27, and the head 22 is pushed up. Because a shear force is applied to the resin annular protrusion 29, the fixed resin annular protrusion 29 is ruptured and torn to pieces and the head 22 slides up inside the housing 11.

At this time, the head 22 slides smoothly due to the action of the air drain port 34. Because the rod 23 also rises following the upward movement of the head 22, the portion of the rod 23 that protrudes outwardly from the housing 11 is instantaneously pulled into the housing 11.

When the head 22 rises and reaches the bottom surface 33 of the cup member 30, the head 22 fits into and is held by the reduced-diameter portion 35, thereby preventing the return stroke of the piston 21 after the actuation.

Figure 2:
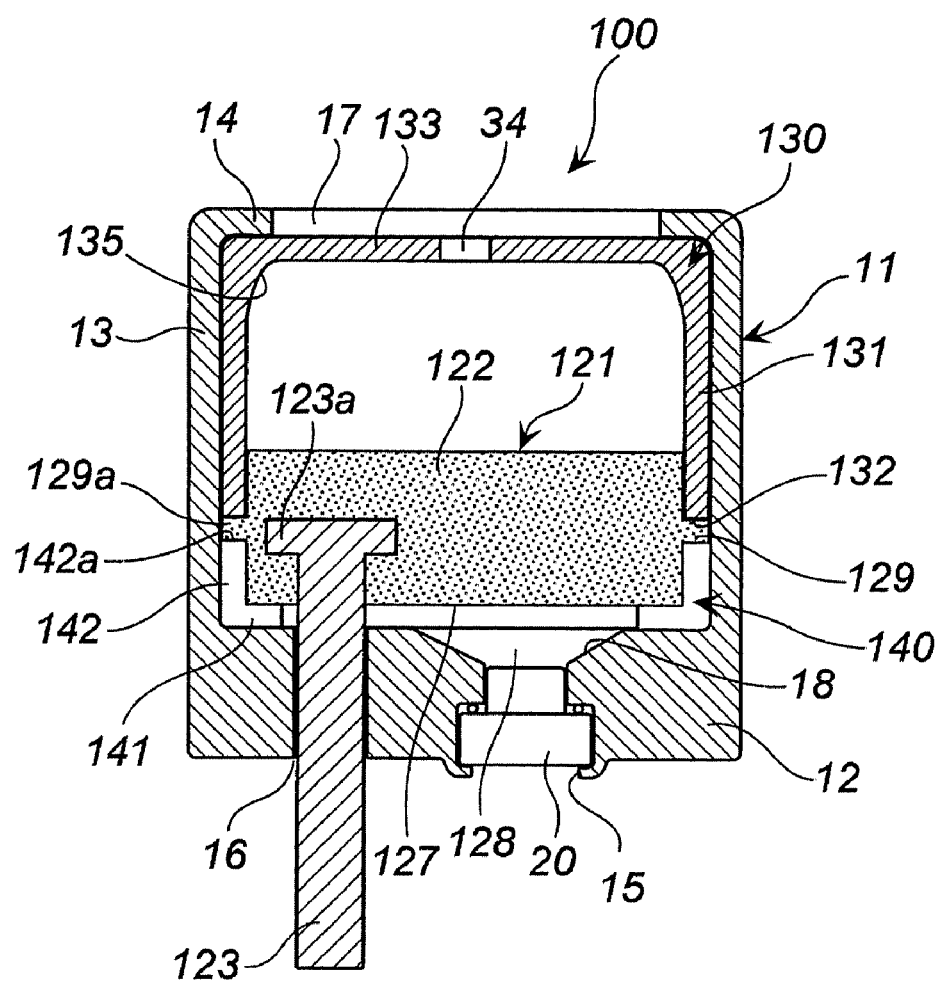
FIG. 2 shows a longitudinal sectional view of an actuator of another embodiment.

(2) Actuator Shown in FIG. 2

FIG. 2 is a longitudinal sectional view of an actuator 100 of another embodiment. Components denoted by symbols identical those in FIG. 1 are meant to be identical structural elements.

In the housing 11, a substantially cylindrical retainer 140 made from a metal is disposed in a position closest to an igniter 20.

The retainer 140 is an assembly of an annular flat surface 141 and an annular wall surface 142 that is formed in the vertical direction from the annular flat surface 141. The outer diameter of the annular wall surface 142 is set to be slightly less than the inner diameter of a housing 11. Therefore, the annular wall surface 142 abuts against the inner surface of a circumferential wall 13 of the housing, and the annular flat surface 141 is pressed against the inner surface of the housing wall 12.

A piston 121 is disposed in the housing 11, in a state of contact with the retainer 140. The piston 121 is an assembly of a resin head 122 and a metal rod 123 that extends in the perpendicular direction from a position offset from the central portion of the head 122. In the piston 121, the resin head 122 and the metal rod 123 are formed integrally. Because an enlarged-diameter section 123a that has a diameter larger than that of the rod 123 is inserted into the head 122 and tightly joined thereto, the rod 123 is prevented from falling out of the head 122.

The head 122 is positioned inside the housing 11, and the rod 123 extends to the outside of the housing 11 from inside the housing 11 via a through hole 16.

The head 122 has a resin annular protrusion 129 that is formed continuously in the circumferential direction and extends radially and outwardly in the vicinity of the central portion in the lengthwise direction. The diameter of the head 122 is slightly less than the inner diameters of a cup member 130 and the retainer 140, the diameter of the head 122 including the resin annular protrusion 129 is slightly less than the inner diameter of the housing 11, and the circumferential surface 129a of the resin annular protrusion 129 faces the inner surface of the circumferential wall 13 of the housing. A configuration in which the head 122 is made from a metal and a resin ring member (serving as the resin annular protrusion 129) is integrally formed on the circumferential surface of the head may be also used.

The head 122 is supported by the annular flat surface 141 of the retainer 140 and the inner surface of the annular wall surface 142, and a circumferential edge 142a of the open portion of the annular wall surface 142 abuts against the resin annular protrusion 129.

A metal cup member 130 is disposed inside the housing 11 so that the resin annular protrusion 129 of the head 122 is squeezed together the retainer 140 from both sides.

The cup member 130 is inserted from the open portion 17 of the housing 11, the distal end portion of the circumferential wall 131 is inserted into a cylindrical gap between the circumferential wall 13 of the housing and the head 122, and the circumferential edge 132 of the open portion of the cup member 130 abuts against the resin annular protrusion 129.

The inner diameter of the cup member 130, except the vicinity of a bottom surface 133, is so adjusted as to enable the sliding of the head 122, and the inner diameter from a portion close to a bottom surface 133 to the bottom surface 133 is set to decrease gradually, to be smaller than diameter of the head 122 (a reduced-diameter portion 135 is formed). An air drain port 34 is provided in the central portion of the bottom surface 133 of the cup member 130.

Because the upper end portion of the circumferential wall 13 of the housing is crimped and pressed with pressure (crimped portion 14), the bottom surface 133 of the cup member 130 receives this pressure, and the circumferential edge 132 of the open portion presses with pressure the resin annular protrusion 129. As a result, the resin annular protrusion 129 is squeezed from both sides and fixed by the circumferential edge 132 of the open portion of the cup member 30 and the circumferential edge 142 of the annular wall surface 142 of the retainer.

Between an igniter 20 and an end surface of the head 122 on the igniter 20 side, a space 128 is formed by the housing wall 12, head 122, rod 123, retainer 140, and through hole 15 (section where the igniter 20 is not attached).

A portion of the end surface of the head 122 on the igniter 20 side that faces the space 128 serves as a pressure-receiving surface 127. In order to increase heat resistance, the pressure-receiving surface 127 can be covered with a metal foil.

The pressure-receiving surface 127 has an area of about 63% the area of the end surface of the head 122 on the igniter 20 side (the area of the uncovered end surface). The pressure-receiving surface 127 can be further increased by the presence of the space 128. Further, because an inclined surface 18 is formed on the inner surface of the housing wall 12, the combustion product generated by the actuation of the igniter 20 spread radially and collide with the pressure-receiving surface 127. As a result, the transmission of pressure produced by the combustion product generated from the igniter 20 is improved and the piston 121 moves more smoothly.

The actuator 100 in accordance with the present invention may also have a configuration in which similar operation is enabled by forming a component similar to the resin annular protrusion 129 integrally with the housing 11.

The operation of the actuator 100 will be described below. Before the igniter 20 is actuated, the resin annular protrusion 129 is fixed by the cup member 130 and the retainer 140. Therefore, the piston 121 cannot move even when vibrations are applied from the outside. When the igniter 20 is actuated, the combustion product is generated and collide with the pressure-receiving surface 127, and the head 122 is pushed up. Because a shear force is applied to the resin annular protrusion 129, the fixed resin annular protrusion 129 is ruptured and torn to pieces and the head 122 slides up inside the housing 11.

At this time, the head 122 slides smoothly due to the action of the air drain port 34. Because the rod 123 also rises following the upward movement of the head 122, the portion of the rod 123 that protrudes outwardly from the housing 11 is instantaneously pulled into the housing 11.

When the head 122 rises and reaches the bottom surface 133 of the cup member 130, the head 122 fits into and is held by the reduced-diameter portion 135, thereby preventing the return stroke of the piston 121 after the actuation.

Figure 3:
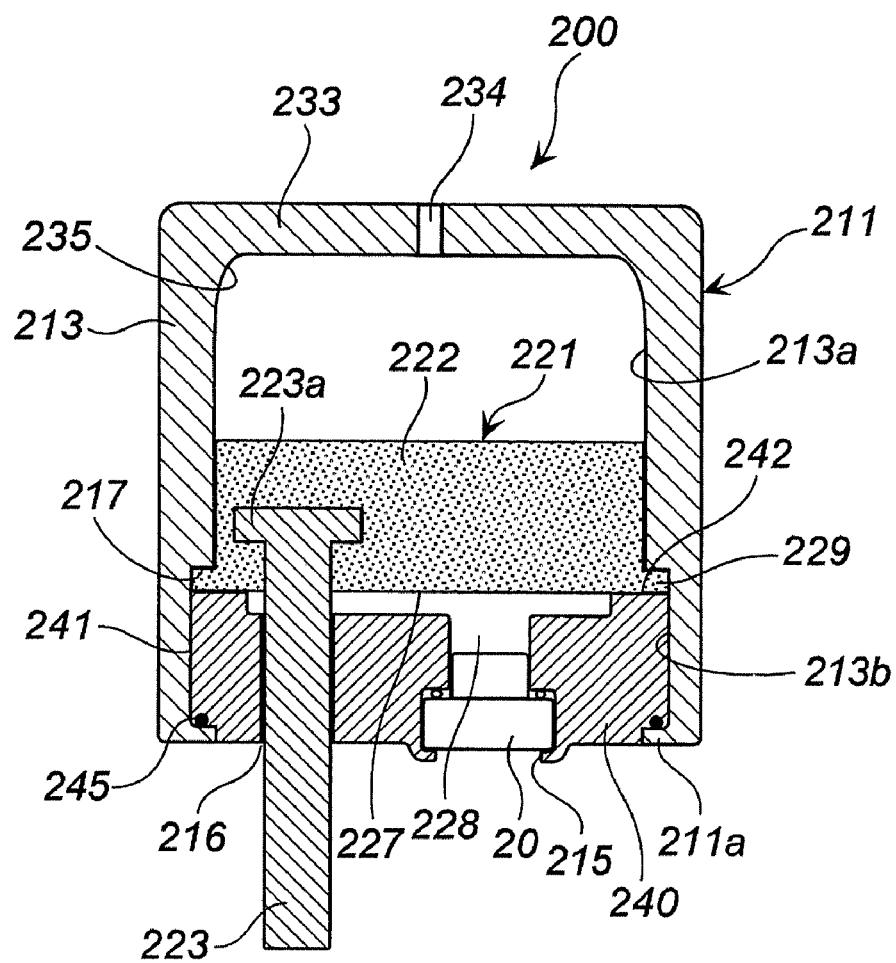
FIG. 3 shows a longitudinal sectional view of an actuator of another embodiment.

(3) Actuator Shown in FIG. 3

FIG. 3 is a longitudinal sectional view of an actuator 200 of another embodiment.

In the actuator 200, an outer shell is formed by a combination of a housing 211 and a collar 240. The housing 211 is made from a metal such as stainless steel, aluminum, zinc, or the like.

The housing 211 has a cup-like shape formed by a circumferential wall 213 and a bottom surface 233, and an air drain port 234 is provided in the central portion of a bottom surface 233. The inner diameter, with the exception of the vicinity of the bottom surface 233, is adjusted so that a head 222 can slide, and a reduced-diameter portion 235 is formed from the portion close to the bottom surface 233 to the bottom surface 233.

An inner wall surface 213a and an inner wall surface 213b having different diameters are formed at the inner wall surface of the circumferential wall 213, and an annular step surface 217 that is continuous in the circumferential direction is formed in the boundary portion of the inner wall surface 213a and the inner wall surface 213b.

The piston 221 is an assembly of a resin head 222 and a metal rod 223 that extends in the perpendicular direction from a position offset from the central portion of the head 222. In the piston 221, the resin head 222 and the metal rod 223 are formed integrally. Because an enlarged-diameter section 223a that has a diameter larger than that of the rod 223 is inserted into the head 122 and tightly joined thereto, the rod 223 is prevented from falling out of the head 222. The piston 21 shown in FIG. 1 can be used instead of the piston 221.

The head 222 is positioned inside a housing 211, and the rod 223 extends to the outside of the housing 211 (collar 240) from inside the housing 211 via a through hole 216.

The head 222 has a resin annular protrusion 229 that is formed continuously in the circumferential direction and extends radially and outwardly at the end surface on the igniter 20 side. A circumferential surface of the head 222 abuts against the inner wall surface 213a of the housing, and the resin annular protrusion 229 abuts against the annular step surface 217 and also against the inner wall surface 213b.

The collar 240 is from the same metal as the housing 211 and fits into the open portion of the housing 211. An outer peripheral surface 241 of the collar 240 abuts against the inner wall surface 213b of the housing, and an annular flat surface 242 abuts against the end surface of the head 222 including the resin annular protrusion 229.

Because the collar 240 is crimped in a crimped portion 211a (an O-ring 245 is disposed to prevent moisture penetration) and fixed to the housing 211, the collar is pressed with pressure in the direction of the head 222. As a result, the resin annular protrusion 229 is fixed in a state in which it is squeezed from both sides by the collar 240 and the annular step surface 217.

The collar 240 has two through holes 215, 216, and an electric igniter 20 is attached in the through hole 215.

A space 228 is formed by the head 222, rod 223, collar 240, and through hole 215 (portion to which the igniter 20 is not attached) between the igniter 20 and the end surface of the head 222 on the igniter 20 side.

A portion of the end surface of the head 222 on the igniter 20 side that faces the space 228 serves as a pressure-receiving surface 227. In order to increase heat resistance, the pressure-receiving surface 227 can be covered with a metal foil.

The pressure-receiving surface 227 has an area of about 51% the area of the end surface of the head 222 on the igniter 20 side (the area of the uncovered end surface). The pressure-receiving surface 227 can be further increased by the presence of the space 228. Therefore, the transmission of pressure produced by the combustion product generated from the igniter 20 is improved and the piston 221 moves more smoothly.

The operation of the actuator 200 will be described below. Before the igniter 20 is actuated, the resin annular protrusion 229 is fixed by the annular step surface 217 and the collar 240.

Therefore, the piston 221 cannot move even when vibrations are applied from the outside. When the igniter 20 is actuated, the combustion product is generated and collide with the pressure-receiving surface 227, and the head 222 is pushed up. Because a shear force is applied to the resin annular protrusion 229, the fixed resin annular protrusion 229 is ruptured and torn to pieces and the head 222 slides up inside the housing 211.

At this time, the head 222 slides smoothly due to the action of the air drain port 234. Because the rod 223 also rises following the upward movement of the head 222, the portion of the rod 223 that protrudes outwardly from the housing 211 is instantaneously pulled into the housing 211.

When the head 222 rises and reaches the bottom surface 233 of the housing, the head 222 fits into and is held by the reduced diameter portion 235, thereby preventing the return stroke of the piston 221 after the actuation.

Figure 4:
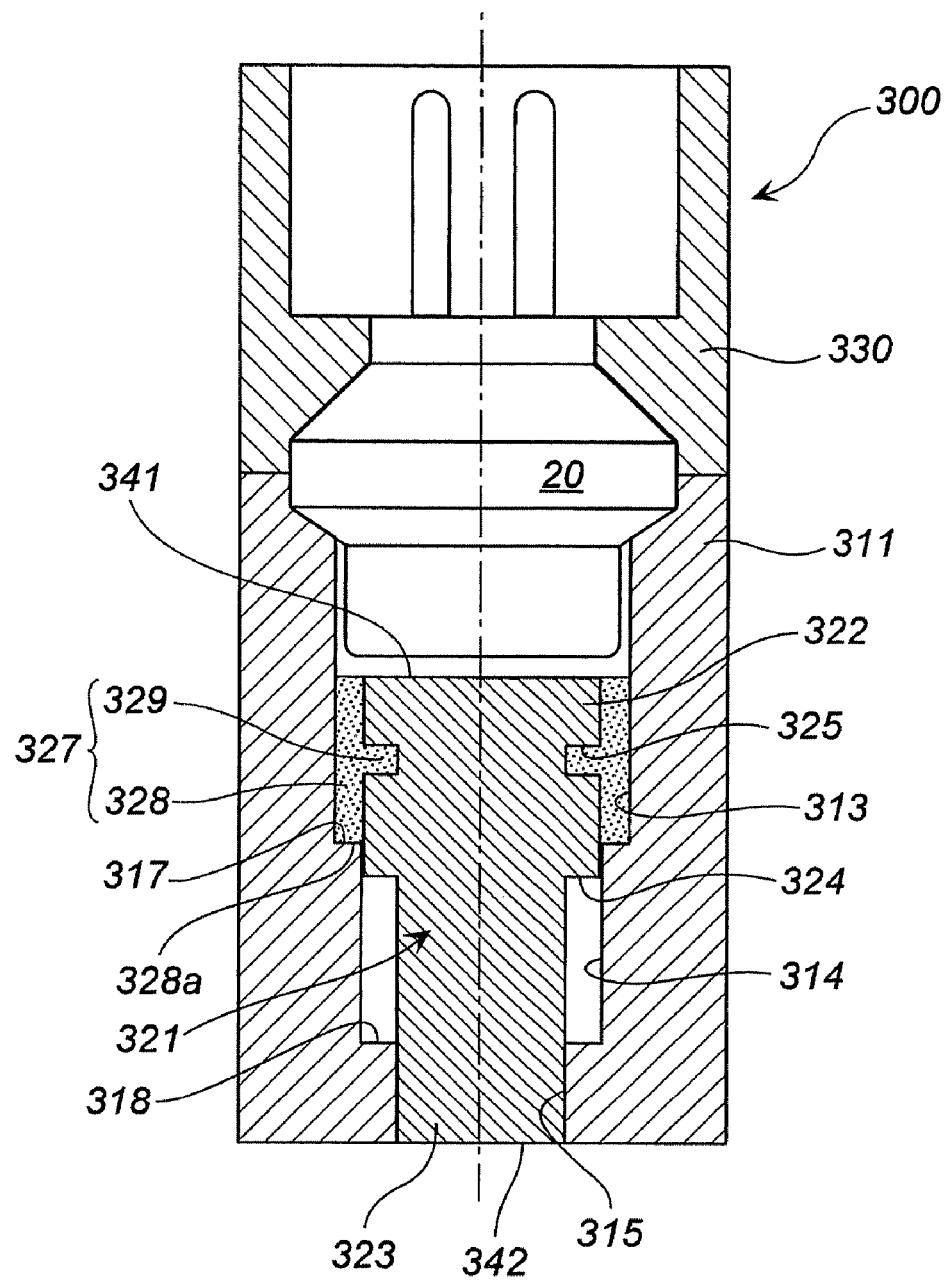
FIG. 4 shows a longitudinal sectional view of an actuator of another embodiment.

(4) Actuator Shown in FIG. 4

FIG. 4 is a longitudinal sectional view of an actuator 300 of another embodiment.

In the actuator 300, an outer shell is formed by a combination of a housing 311 and a collar 330. An igniter 20 is held by both the housing 311 and the collar 330. The housing 311 is made from a metal such as stainless steel, aluminum, zinc, or the like.

A first inner wall surface 313, a second inner wall surface 314, and a third inner wall surface 315 that have different inner diameters are formed at the inner wall of the housing 311. A first annular step surface 317 that is continuous in the circumferential direction is formed in the boundary portion of the first inner wall surface 313 and the second inner wall surface 314, and a second annular step surface 318 that is continuous in the circumferential direction is formed in the boundary portion of the second inner wall surface 314 and the third inner wall surface 315.

A piston 321 that is made from a metal (stainless steel, aluminum, zinc, or the like), except the resin portion thereof, is disposed inside the housing 311. In the piston 321, a head 322 is integrated with a rod 323 that has a diameter slightly less than that of the head 322, and a step is formed in the boundary portion of the head 322 and the rod 323. The step surface serves as an annular stopper portion 324. An annular groove 325 that is continuous in the circumferential direction is formed in the vicinity of the central portion in the longitudinal direction of the head 322.

A resin tubular member 327 is attached to the outer peripheral surface of the head 322. The resin tubular member 327 has a tubular wall portion 328 and an annular protrusion 329 that protrudes from the inner peripheral surface of the tubular wall portion 328. The resin tubular member 327 is formed integrally with the head 322 so that the annular protrusion 329 is fitted into the annular groove 325 provided in the outer peripheral surface of the head 322. The peripheral edge 328a of the open portion of the tubular wall section 328 abuts against the first annular step surface 317. The resin tubular member 327 may be fixed to the housing 311.

The operation of the actuator 300 will be described below. Before the igniter 20 is actuated, the peripheral edge 328a of the open portion of the tubular wall section 328 abuts against the first annular step surface 317, the annular protrusion 329 is fitted into the annular groove 325 provided in the outer peripheral surface of the head 322, the outer surface of the resin tubular member 327 abuts against the first inner wall surface 313, and a friction force is generated. Therefore, the piston 321 does not move even when vibrations are applied from the outside.

When the igniter 20 is actuated, the combustion product is generated and collide with an end surface (pressure-receiving surface) 341 of the head, and the head 322 is pushed down. Because a shear force is applied to the annular protrusion 329, the fixed annular protrusion 329 is ruptured and torn to pieces and the head 322 slides inside the housing 311.

Because the rod 323 also goes down following the movement of the head 322, a distal end surface 342 of the rod 323 is instantaneously protruded to the outside of the housing 311. When the head 322 slides and annular stopper section 324 reaches the second annular step surface 318, the sliding movement of the piston 321 is stopped.

Figure 5:
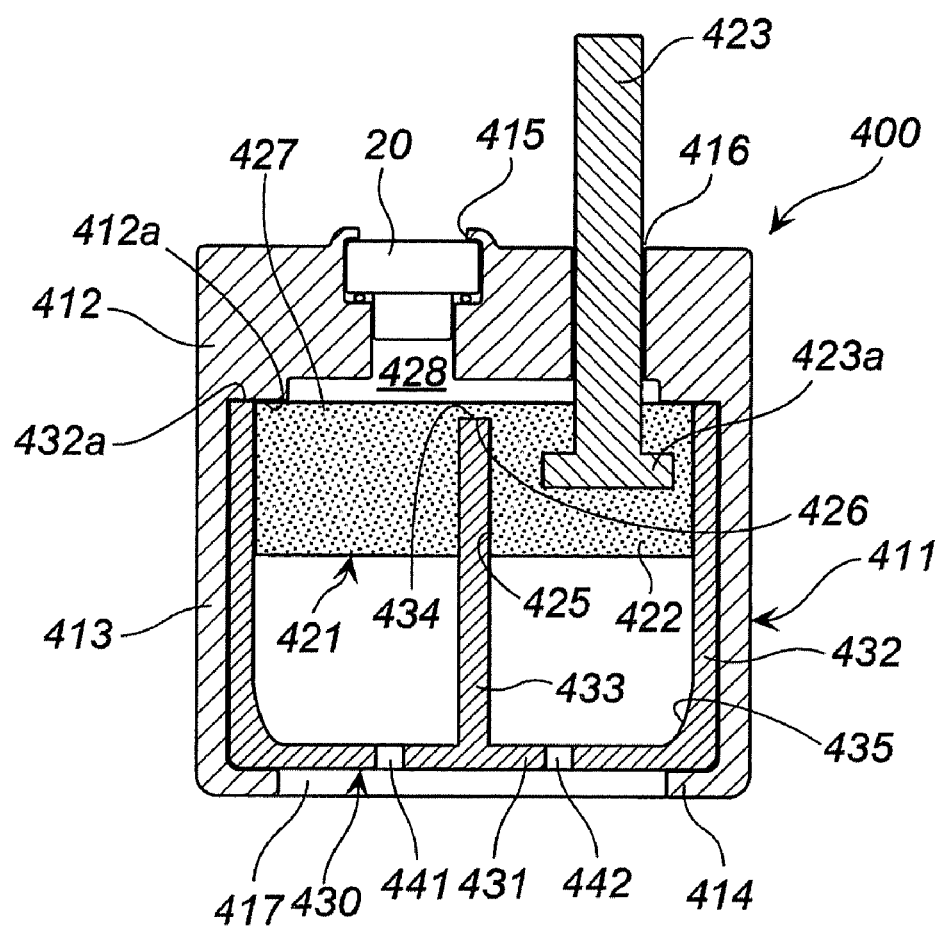
FIG. 5 shows a longitudinal sectional view of an actuator of another embodiment.

(5) Actuator Shown in FIG. 5

FIG. 5 is a longitudinal sectional view of an actuator 400 of another embodiment.

A housing 411 is made from a metal such as stainless steel, aluminum, zinc, or the like. Two through holes 415, 416 are provided in a housing wall 412 at one end of the housing 411, and the other end side is widely opened (open portion 417). The housing wall 412 essentially serves as a collar, and an electric igniter 20 is attached in a through hole 415.

A piston 421 is disposed inside the housing 411. The piston 421 is an assembly of a resin head 422 and a metal rod 423 that extends in a perpendicular direction from a position offset from the central section of the head 422. In the piston 421, the resin head 422 and the metal rod 423 are formed integrally. Because an enlarged-diameter section 423a that has a diameter larger than that of the rod 423 is inserted into the head 422 and tightly joined thereto, the rod 423 is prevented from falling out of the head 422.

The head 422 has a stopper hole 425 in the central portion. The stopper hole 425 does not pass through the head 422 and has a bottom surface 426.

The head 422 is positioned inside the housing 411, and the rod 423 extends from inside the housing 411 to the outside of the housing 411 via the through hole 416.

A cup member 430 is disposed inside the housing 411. The cup member 430 has a bottom surface 431 and a circumferential surface 432 and also has a rod member 433 that extends in the perpendicular direction from the central portion of the bottom surface 431. Two air drain ports 441, 442 are provided in the bottom surface 431.

The cup member 430 is fitted from the open portion 417 of the housing 411. The rod member 433 is inserted into the stopper hole 425, and a distal end portion 434 of the rod member 433 abuts against a bottom portion 426 of the stopper hole 425. By crimping the distal end portion of the housing circumferential wall 413 (crimped section 414), the bottom surface 431 is pressed with pressure and fixed. Therefore, the cup member 430 receives the pressure, and the distal end portion 434 of the rod member 433 presses the bottom portion 426 of the stopper hole 425.

The inner diameter of the cup member 430, except the vicinity of the bottom surface 431, is so adjusted as to enable the sliding of the head 422, and in the inner diameter from a portion close to the bottom surface 431 to the bottom surface 431, a reduced-diameter portion 435 is formed.

A space 428 is formed by the housing wall 412, head 422, rod 423, and through hole 415 (section where the igniter 20 is not attached) between the igniter 20 and the end surface of the head 422 on the igniter 20 side.

A portion of the end surface of the head 422 on the igniter 20 side that faces the space 428 serves as a pressure-receiving surface 427. The pressure-receiving surface 427 can be covered with a metal foil to increase heat resistance.

The pressure-receiving surface 427 has an area of about 67% the area of the end surface of the head 422 on the igniter 20 side (end surface in the state of not being covered). Because the pressure-receiving surface 427 can be further increased by the presence of the space 428, the transmission of pressure produced by combustion product generated from the igniter 20 is improved and the piston 421 moves more smoothly.

The operation of the actuator 400 will be described below. Before the igniter 20 is actuated, the distal end portion 434 of the rod member 433 presses with pressure the bottom portion 426 of the stopper hole 425. Therefore, the piston 421 cannot move even when vibrations are applied from the outside. Where the combustion product is generated and collide with the pressure-receiving surface 427, pushing the head 422 down, when the igniter 20 is actuated, the distal end portion 434 of the rod member 433 breaks through the bottom portion 426 of the stopper hole 425 and the head 422 slides down inside the housing 11.

At this time, the head 422 slides smoothly due to the action of the air drain holes 441, 442. Because the rod 423 also moves down following the downward movement of the head 422, the portion of the rod 423 that protrudes outwardly from the housing 411 is instantaneously pulled into the housing 411.

When the head 422 descends and reaches the bottom surface 431 of the cup member 430, the head 422 fits into and is held by the reduced-diameter portion 435, thereby preventing the return stroke of the piston 421 after the actuation.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A pyrotechnic actuator, comprising:
a housing,
a piston slidable inside the housing,
an igniter disposed within the housing and causing the piston to slide,
the piston including a piston head having a pressure-receiving surface with which a combustion product, produced by actuation of the igniter, collides,
a piston rod extending from the piston head and further,
a resin portion provided at least in a part of the piston,
the resin portion being disposed in contact with a member including the housing,
the piston being fixed by contacting the resin portion to the member including the housing, and
the piston being prevented from moving before activation of the igniter.

2. The pyrotechnic actuator according to claim 1, wherein the resin portion is a resin protrusion formed radially on the outer side of the piston, and
the resin protrusion is fixed by a combination of an inner wall surface of the housing and at least one of a cup member and a tubular member disposed inside the housing to fix the piston, whereby the piston is prevented from moving before the igniter is actuated.

3. The pyrotechnic actuator according to claim 1, wherein the resin portion is a resin protrusion formed radially on the outer side of the piston,
a step portion is provided in an inner wall surface of the housing, the piston is fixed in a state where the resin protrusion abuts against the step portion, and the piston is prevented from moving before the igniter is actuated.

4. The pyrotechnic actuator according to claim 1, wherein
the resin portion is a tubular member having an annular protrusion projecting from the inner circumferential surface of the resin member, the piston head has an annular groove formed on the outer circumferential surface thereof, an inner circumferential surface of the tubular member abuts against the outer circumferential surface of the piston head, and the annular protrusion of the tubular member is fitted into the annular groove of the piston head, whereby the piston and the tubular member are integrated, and a circumferential edge of an open portion at one end side of the tubular member abuts against an annular step portion formed at the inner wall surface of the housing, whereby the piston is fixed and the piston is prevented from moving before the igniter is actuated.

5. The pyrotechnic actuator according to claim 1, wherein
the piston head has a non-through hole which is formed in a thickness direction in an apex surface of the piston head and which has at least the bottom portion thereof formed from a resin, a cup member having a rod member provided to protrude from a bottom surface thereof is fixed on the circumference thereof by the inner wall surface of the housing and accommodated in combination with the piston head inside the housing, and the rod member of the cup member is inserted into the non-through hole of the piston head, and a distal end portion of the rod member abuts against the bottom portion of the non-through hole, whereby the piston is fixed and the piston is prevented from moving before the igniter is actuated.

6. The pyrotechnic actuator according to claim 1 or 2, wherein a space formed inside the housing where the piston slides is set such that an inner diameter of one end portion where the piston head is located before actuating the igniter is smaller than an inner diameter of the opposite end portion, so that the piston head can be fitted into the smaller-diameter end portion.

7. The pyrotechnic actuator according to claim 1 or 2, wherein a pressure-receiving surface of the piston head has an area of 50% or more the area of the end surface including a central portion of an end surface of the piston head that faces the igniter.

* * * * *